US012423745B2

(12) United States Patent
Saito et al.

(10) Patent No.: US 12,423,745 B2
(45) Date of Patent: *Sep. 23, 2025

(54) METHOD AND APPARATUS FOR FACILITATING META SEARCH PROXY BIDDING

(71) Applicant: BYTEDANCE INC., Wilmington, DE (US)

(72) Inventors: Kevin Saito, Chicago, IL (US); Barry O'Sullivan, Chicago, IL (US); Taylor Dykes, Chicago, IL (US); Giovanni Gargiulo, Chicago, IL (US)

(73) Assignee: BYTEDANCE INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/672,699

(22) Filed: May 23, 2024

(65) Prior Publication Data

US 2024/0420228 A1 Dec. 19, 2024

Related U.S. Application Data

(63) Continuation of application No. 17/811,141, filed on Jul. 7, 2022, now Pat. No. 12,033,209, which is a (Continued)

(51) Int. Cl.

*G06Q 30/00* (2023.01)
*G06Q 30/08* (2012.01)

(52) U.S. Cl.

CPC .................................... *G06Q 30/08* (2013.01)

(58) Field of Classification Search

CPC ............... G06Q 30/00; G06Q 30/0601; G06Q 30/0641; G06Q 30/08

See application file for complete search history.

(56) References Cited

U.S. PATENT DOCUMENTS

| | | | | |
|---|---|---|---|---|
| 7,865,420 | B1 * | 1/2011 | Daman | G06Q 30/08 705/37 |
| 8,095,536 | B1 * | 1/2012 | Kelly | G06Q 30/0201 707/723 |

(Continued)

OTHER PUBLICATIONS

Griesmayr, Carla. "Digital marketing in the hospitality industry: what influence does digital platform economy have on the booking rates of the hotel industry." (2019). (Year: 2019).*

(Continued)

*Primary Examiner* — Christopher B Seibert
(74) *Attorney, Agent, or Firm* — Alston & Bird LLP

(57) ABSTRACT

Various methods are provided for programmatically providing a platform for responding dynamically providing a response to a property level availability call through API request based on run-time information. One example method may comprise receiving the property level availability call, the property level availability call configured to elicit a response identifying an availability of one or more of the plurality of specified properties for a specified time frame, determining, based on an associated bid, whether an affirmative response to the property level availability call is profitable, and in an instance in which the affirmative response is profitable, causing transmission of the affirmative response.

20 Claims, 6 Drawing Sheets

Related U.S. Application Data continuation of application No. 16/884,259, filed on May 27, 2020, now Pat. No. 11,416,922, which is a continuation of application No. 15/287,413, filed on Oct. 6, 2016, now Pat. No. 10,699,332.

(60) Provisional application No. 62/238,477, filed on Oct. 7, 2015.

(56) References Cited

U.S. PATENT DOCUMENTS

| | | | | | |
|---|---|---|---|---|---|
| 8,326,693 | B1 * | 12/2012 | Chan | G06Q 20/381 | 705/26.4 |
| 10,356,052 | B1 * | 7/2019 | Ashley | G06F 21/6245 | |
| 10,672,040 | B1 * | 6/2020 | Yolken | G06Q 30/0277 | |
| 10,699,332 | B1 * | 6/2020 | Saito | G06Q 30/08 | |
| 11,416,922 | B2 * | 8/2022 | Saito | G06Q 30/08 | |
| 2002/0038282 | A1 * | 3/2002 | Montgomery | G06Q 40/04 | 705/37 |
| 2002/0120553 | A1 * | 8/2002 | Bowman-Amuah | G06Q 20/102 | 705/26.1 |
| 2003/0125038 | A1 * | 7/2003 | Western | H04W 72/121 | 455/450 |
| 2003/0220867 | A1 * | 11/2003 | Goodwin | G06Q 40/02 | 705/37 |
| 2004/0068486 | A1 * | 4/2004 | Chidlovskii | G06F 16/9538 | |
| 2004/0080545 | A1 * | 4/2004 | Kobal | G06F 3/0482 | 715/824 |
| 2004/0103040 | A1 * | 5/2004 | Ronaghi | G06Q 30/08 | 705/14.69 |
| 2004/0109030 | A1 * | 6/2004 | Farrington | G06F 3/0481 | 715/808 |
| 2004/0215527 | A1 * | 10/2004 | Grove | G06Q 30/08 | 705/26.3 |
| 2004/0267561 | A1 * | 12/2004 | Meshkin | G06Q 30/02 | 709/224 |
| 2005/0004830 | A1 * | 1/2005 | Rozell | G06Q 30/0205 | 705/7.41 |
| 2005/0015308 | A1 * | 1/2005 | Grove | G06Q 30/08 | 705/26.3 |
| 2005/0015325 | A1 * | 1/2005 | Grove | G06Q 30/08 | 705/37 |
| 2005/0027641 | A1 * | 2/2005 | Grove | G06Q 30/02 | 705/37 |
| 2005/0065866 | A1 * | 3/2005 | Grove | G06Q 30/0641 | 705/37 |
| 2005/0108125 | A1 * | 5/2005 | Goodwin | G06Q 30/08 | 705/37 |
| 2006/0242129 | A1 * | 10/2006 | Libes | G06Q 30/08 | |
| 2007/0198398 | A1 * | 8/2007 | Rios | G06Q 40/04 | 705/37 |
| 2008/0114671 | A1 * | 5/2008 | Goel | G06Q 30/08 | 705/37 |
| 2010/0235178 | A1 * | 9/2010 | Firminger | G06Q 10/06375 | 705/2 |
| 2010/0235182 | A1 * | 9/2010 | Firminger | G16H 40/20 | 705/2 |
| 2010/0235183 | A1 * | 9/2010 | Firminger | G16H 40/67 | 705/2 |
| 2010/0235184 | A1 * | 9/2010 | Firminger | G16H 50/20 | 705/2 |
| 2010/0235185 | A1 * | 9/2010 | Firminger | G06Q 10/06 | 705/2 |
| 2010/0235186 | A1 * | 9/2010 | Firminger | G06Q 30/08 | 705/2 |
| 2010/0235187 | A1 * | 9/2010 | Firminger | G06Q 30/08 | 705/2 |
| 2010/0235188 | A1 * | 9/2010 | Firminger | G06Q 10/06 | 705/2 |
| 2010/0235189 | A1 * | 9/2010 | Firminger | G16H 70/20 | 705/2 |
| 2010/0235190 | A1 * | 9/2010 | Firminger | G06Q 30/02 | 705/2 |
| 2010/0235191 | A1 * | 9/2010 | Firminger | G06Q 30/02 | 705/2 |
| 2010/0235195 | A1 * | 9/2010 | Firminger | G06Q 40/08 | 705/26.1 |
| 2010/0235242 | A1 * | 9/2010 | Firminger | G06Q 30/0269 | 705/14.66 |
| 2010/0241448 | A1 * | 9/2010 | Firminger | G16H 50/20 | 715/833 |
| 2010/0241454 | A1 * | 9/2010 | Firminger | G16H 40/67 | 715/833 |
| 2010/0274577 | A1 * | 10/2010 | Firminger | G16H 40/63 | 705/2 |
| 2010/0274578 | A1 * | 10/2010 | Firminger | G16H 40/00 | 705/2 |
| 2010/0312664 | A1 * | 12/2010 | Roseman | G06Q 30/06 | 705/26.3 |
| 2011/0145087 | A1 * | 6/2011 | Daman | H04L 67/02 | 705/26.3 |
| 2011/0202361 | A1 * | 8/2011 | Firminger | G16H 20/30 | 705/2 |
| 2012/0116870 | A1 * | 5/2012 | Zucker | G06Q 30/0275 | 705/14.46 |
| 2012/0179482 | A1 * | 7/2012 | Garms | G16H 50/20 | 705/2 |
| 2013/0151367 | A1 * | 6/2013 | Lazar | G06Q 30/0611 | 705/26.4 |
| 2013/0204732 | A1 * | 8/2013 | Moskos | G06Q 30/08 | 705/26.3 |
| 2013/0211946 | A1 * | 8/2013 | Montgomery | G06Q 40/04 | 705/26.3 |
| 2013/0268446 | A1 * | 10/2013 | Buschmann | G06Q 30/00 | 705/304 |
| 2014/0358714 | A1 * | 12/2014 | Williams | G06Q 30/08 | 705/26.3 |
| 2015/0120484 | A1 * | 4/2015 | Kaganov | G06Q 30/0631 | 705/26.3 |
| 2018/0150889 | A1 * | 5/2018 | Hilliard | G06Q 30/08 | |
| 2018/0197636 | A1 * | 7/2018 | Firminger | G16H 20/10 | |
| 2019/0080394 | A1 * | 3/2019 | Wang | G06Q 30/08 | |
| 2019/0287138 | A1 * | 9/2019 | Buchalter | G06Q 30/0275 | |
| 2020/0364778 | A1 * | 11/2020 | Saito | G06Q 30/08 | |
| 2021/0090125 | A1 * | 3/2021 | Logvinskiy | G06Q 30/0267 | |
| 2021/0118045 | A1 * | 4/2021 | Haulman | G06F 16/972 | |
| 2023/0368283 | A1 * | 11/2023 | Wang | G06Q 30/018 | |
| 2024/0054556 | A1 * | 2/2024 | Lekas, Jr. | G06Q 30/08 | |

OTHER PUBLICATIONS

Menacer, Djamel Eddine, Christophe Sibertin-Blanc, and Habiba Drias. "A market-oriented agent-based model for information retrieval." International Journal of Digital Information and Wireless Communications 3.3 (2013): pp. 72. (Year: 2013).*

U.S. Appl. No. 17/811,141, filed Jul. 7, 2022, U.S. Pat. No. 12,033,209, Issued.

U.S. Appl. No. 16/884,259, filed May 27, 2020, U.S. Pat. No. 11,416,922, Issued.

U.S. Appl. No. 15/287,413, filed Oct. 6, 2016, U.S. Pat. No. 10,699,332, Issued.

Fakhry, Samir M., et al. "Trauma center finances and length of stay: identifying a profitability inflection point." Journal of the American College of Surgeons 210.5 (2010): 817-821. (Year: 2010).

Granados, Nelson F., Robert J. Kauffman, and Bradley King. "The emerging role of vertical search engines in travel distribution: a newly-vulnerable electronic markets perspective." Proceedings of the 41st Annual Hawaii International Conference on System Sciences (HICSS 2008). IEEE, 2008. (Year: 2008).

Singh, Ratna. "Design and Implementation of fauxBay: Test-Bed for Bidding Agents in Online Auction Markets." (2006). (Year: 2006).

(56) References Cited

OTHER PUBLICATIONS

Walczak, Steven, and Dawn Gregg. “Building Business Heuristics with Data-Mining Internet Agents.” (2003). (Year: 2003).

* cited by examiner

METHOD AND APPARATUS FOR FACILITATING META SEARCH PROXY BIDDING

CROSS REFERENCES TO RELATED APPLICATIONS

This application is a continuation of U.S. application Ser. No. 17/811,141, filed Jul. 7, 2022, which is a continuation of U.S. application Ser. No. 16/884,259, filed on May 27, 2020, which is a continuation of U.S. application Ser. No. 15/287,413, filed on Oct. 6, 2016, which claims the benefit of U.S. Provisional Patent Application No. 62/238,477, filed on Oct. 7, 2015, the entire contents of which are incorporated herein by reference.

TECHNOLOGICAL FIELD

Embodiments of the invention relate, generally, to techniques for metasearch proxy bidding, and more specifically to managing participation in metasearch auctions.

BACKGROUND

Those consumers looking for the best deals related to, for example hotel rooms, flights, rental cars or the like, used to have to search multiple service suppliers (e.g., travel related websites or the like). Metasearch systems now offer the convenience of aggregating information from several sources (e.g., travel related websites and suppliers) thereby reducing the number of searches necessary to find the best deals.

These so called metasearch systems may be configured for aggregating search results from multiple sources to identify, or otherwise obtain the lowest cost of hotel stays or airfare. For example, a metasearch system may be configured for performing queries (e.g., travel reservation queries) and presenting the search results from multiple websites (e.g., travel websites) to a consumer.

In some embodiments, a metasearch system may be configured to enable consumers to enter search criteria which is then used to generate queries to the multiple sources, the returned results then utilized to generate a listing of, for example, low-priced service offerings. The sources may include one or more of a centralized reservation system (CRS), a global distribution system (GDS), or any other system where multiple service providers, such as airlines, hotels, car rental agencies, cruise lines, bus services, etc., make services available for booking, reservation, and/or purchase. In some embodiments, suppliers may correspond to a system provided by an individual service provider (e.g., a specific airline, hotel or hotel chain, car rental agency, cruise line, bus service, etc.).

Given the volatile nature of the inventory, availability of any given service (e.g., a specific flight or hotel room) may be altered within a very short time period. The sources may be provided updated listings of inventory daily. The metasearch system aggregates results from other sites then redirects the visitor to one of these sites for reservations.

Metasearch systems derive revenue from pay per click advertising, for example, when the consumer clicks through to one of the compared websites (for example, when the consumer is redirected to the source's website). Accordingly, sources may provide, for each available service, a click-through bid to the metasearch system (e.g., reflecting how much a source is willing to pay to expose a consumer to a specified property offered by the source).

However, while metasearch systems send user requests to several search engines and/or databases and aggregate the results for a single destination, there is no technology known in the art which assists the supplier in optimizing revenue and profitability engaging in meta-auctions by managing participation in the meta-auctions based on run-time factors.

Overview

An affiliate system may be authorized and otherwise enabled to provide for sale and sell particular services (e.g., hotel stays at one or more specified properties). In order to compete with other suppliers (e.g., who may also be authorized and otherwise enabled to provide for sale and sell particular services), the present invention is directed to methods, apparatuses, and computer readable media for ensuring participation in metasearch auctions is economically viable and enabling more granular bid management levers, including, for example, both pre-computed values and run time information, to successfully bid for traffic at scale in the metasearch environment.

In an exemplary embodiment, the affiliate system may compete with one or more other supplier whose profit margins may be different but who bid based on, for example, a weighted average stay across all searches. To compete, participation may be managed using availability and one or more of length of stay, property margin and overall price. For example, given that the bid price is fixed, those meta-auctions for placement in response to searches with, for example, increased length of stays yield more profitability. Specifically, given a bid of $1, a property margin of $20/night, and a single night length of stay, the affiliate system must convert more than 5% to be profitable. Whereas, given a bid of $1, a property margin of $20/night, and a five night length of stay, the affiliate system must only convert more than 1% to be profitable. As such, for specified properties where a conversion rate is less than 5% but more than 1%, the affiliate system may be configured to participate in the meta-auctions for the exemplified five night stay, but not for the one night stay.

In some embodiments, participation may be further managed using additional run time signals, such as, for example, advance purchase window, as well as pre-computed values on the property such as, for example, deals available for cross sell and conversion rate.

As such, when a consumer searches a metasearch system for a particular service (e.g., a hotel stay, a flight, or a car rental) and the metasearch system queries the affiliate system API, the affiliate system may be configured to determine profitability, a likelihood of profitability, or the like and then generate a response accordingly.

BRIEF SUMMARY

Through applied effort, ingenuity, and innovation, solutions to improve such systems have been realized and are described herein.

Various embodiments of the present invention are directed to improved apparatuses, methods, and computer readable media for Meta Search Proxy Bidding Some embodiments may include methods, while other embodiments may include circuitry and/or media configured to implement the methods and/or other functionality discussed herein. For example, one or more processors, and/or other machine components may be configured to implement the functionality discussed herein based on instructions and/or other data stored in memory and/or other non-transitory computer readable media.

These characteristics as well as additional features, functions, and details of various embodiments are described below. Similarly, corresponding and additional embodiments are also described below.

In some embodiments, a method may be provided for programmatically providing a platform for dynamically providing a response to a property level availability call through API request based on run-time information, the method comprising receiving the property level availability call, the property level availability call configured to elicit a response identifying an availability of one or more of the plurality of specified properties for a specified time frame, determining, based on an associated bid, whether an affirmative response to the property level availability call is profitable, in an instance in which the affirmative response is profitable, causing transmission of the affirmative response.

In some embodiments, the method may further comprise, in an instance in which the affirmative response is not profitable, causing delay of the affirmative response. In some embodiments, the method may further comprise calculating whether a bid price is less than a length of stay multiplied by the property margin multiplied by the conversion rate, and in an instance in which the bid price is less than a length of stay multiplied by the property margin multiplied by the conversion rate, determining that the affirmative response is profitable.

In some embodiments, the method may further comprise calculating whether a bid price is less than an average order value multiplied by property margin multiplied by a conversion rate multiplied by return on sales, and in an instance in which the bid price is less than the average order value multiplied by the property margin multiplied by the conversion rate multiplied by the return on sales, determining that the affirmative response is profitable.

In some embodiments, the method may further comprise in advance of a property level availability call, generating a bid sheet, the bid sheet configured to identify a plurality of specified properties and an associated bid for each of the plurality of specified properties. In some embodiments, the method may further comprise determining a property type of the specified property, and generating a second availability call, the second availability call comprising at least information contained in the property level availability call and the property type, the property type indicative of a system to query for availability of the specified property.

In some embodiments, the method may further comprise determining a desired placement in the results for the specified property in advance of a the property level availability call, and determining a desired bid price, the desired bid price configured to achieve the desired bid placement. In some embodiments, the method may further comprise calculating an average order value based on the property level availability call, the calculation being based on the length of stay indicated in the property level availability call.

In some embodiments, the method may further comprise calculating a conversion rate of the specified property identified in the property level availability call based on the advance purchase window, and determining profitability of the desired bid price based on the average order value and the conversion rate. In some embodiments, the method may further comprise calculating the conversion rate based on sales of the specified property or based on sales of the specified property and converted cross sales.

In some embodiments, an apparatus may be provided for programmatically providing a platform for responding to a property level availability call through API request comprising at least one processor and at least one memory including computer program code, the at least one memory and the computer program code configured to, with the processor, cause the apparatus to at least receive the property level availability call, the property level availability call configured to elicit a response identifying an availability of one or more of the plurality of specified properties for a specified time frame, determine, based on an associated bid, whether an affirmative response to the property level availability call is profitable, in an instance in which the affirmative response is profitable, cause transmission of the affirmative response.

In some embodiments, the at least one memory and the computer program code are further configured to, with the processor, cause the apparatus to in an instance in which the affirmative response is not profitable, cause delay of the affirmative response.

In some embodiments, the at least one memory and the computer program code are further configured to, with the processor, cause the apparatus to calculate whether a bid price is less than a length of stay multiplied by the property margin multiplied by the conversion rate, and in an instance in which the bid price is less than a length of stay multiplied by the property margin multiplied by the conversion rate, determine that the affirmative response is profitable.

In some embodiments, the at least one memory and the computer program code are further configured to, with the processor, cause the apparatus to calculate whether a bid price is less than an average order value multiplied by property margin multiplied by a conversion rate multiplied by return on sales, and in an instance in which the bid price is less than the average order value multiplied by the property margin multiplied by the conversion rate multiplied by the return on sales, determine that the affirmative response is profitable.

In some embodiments, the at least one memory and the computer program code are further configured to, with the processor, cause the apparatus to in advance of a property level availability call, generate a bid sheet, the bid sheet configured to identify a plurality of specified properties and an associated bid for each of the plurality of specified properties.

In some embodiments, the at least one memory and the computer program code are further configured to, with the processor, cause the apparatus to determine a property type of the specified property, and generate a second availability call, the second availability call comprising at least information contained in the property level availability call and the property type, the property type indicative of a system to query for availability of the specified property.

In some embodiments, the at least one memory and the computer program code are further configured to, with the processor, cause the apparatus to determine a desired placement in the results for the specified property in advance of a the property level availability call, and determine a desired bid price, the desired bid price configured to achieve the desired bid placement.

In some embodiments, the at least one memory and the computer program code are further configured to, with the processor, cause the apparatus to calculate an average order value based on the property level availability call, the calculation being based on the length of stay indicated in the property level availability call.

In some embodiments, the at least one memory and the computer program code are further configured to, with the processor, cause the apparatus to calculating a conversion rate of the specified property identified in the property level availability call based on the advance purchase window, and determining profitability of the desired bid price based on the average order value and the conversion rate.

In some embodiments, the at least one memory and the computer program code are further configured to, with the processor, cause the apparatus to calculating the conversion rate based on sales of the specified property or based on sales of the specified property and converted cross sales.

In some embodiments, a computer program product may be provided for programmatically providing a platform for responding to a property level availability call through API request comprising at least one non-transitory computer-readable storage medium having computer-executable program code instructions stored therein, the computer-executable program code instructions comprising program code instructions for receiving the property level availability call, the property level availability call configured to elicit a response identifying an availability of one or more of the plurality of specified properties for a specified time frame, determining, based on an associated bid, whether an affirmative response to the property level availability call is profitable, in an instance in which the affirmative response is profitable, causing transmission of the affirmative response.

In some embodiments, the computer-executable program code instructions further comprise program code instructions for in an instance in which the affirmative response is not profitable, causing delay of the affirmative response.

In some embodiments, the computer-executable program code instructions further comprise program code instructions for calculating whether a bid price is less than a length of stay multiplied by the property margin multiplied by the conversion rate, and in an instance in which the bid price is less than a length of stay multiplied by the property margin multiplied by the conversion rate, determining that the affirmative response is profitable.

In some embodiments, the computer-executable program code instructions further comprise program code instructions for calculating whether a bid price is less than an average order value multiplied by property margin multiplied by a conversion rate multiplied by return on sales, and in an instance in which the bid price is less than the average order value multiplied by the property margin multiplied by the conversion rate multiplied by the return on sales, determining that the affirmative response is profitable.

In some embodiments, the computer-executable program code instructions further comprise program code instructions for in advance of a property level availability call, generating a bid sheet, the bid sheet configured to identify a plurality of specified properties and an associated bid for each of the plurality of specified properties.

In some embodiments, the computer-executable program code instructions further comprise program code instructions for determining a property type of the specified property, and generating a second availability call, the second availability call comprising at least information contained in the property level availability call and the property type, the property type indicative of a system to query for availability of the specified property.

In some embodiments, the computer-executable program code instructions further comprise program code instructions for determining a desired placement in the results for the specified property in advance of a the property level availability call, and determining a desired bid price, the desired bid price configured to achieve the desired bid placement.

In some embodiments, the computer-executable program code instructions further comprise program code instructions for calculating an average order value based on the property level availability call, the calculation being based on the length of stay indicated in the property level availability call.

In some embodiments, the computer-executable program code instructions further comprise program code instructions for calculating a conversion rate of the specified property identified in the property level availability call based on the advance purchase window, and determining profitability of the desired bid price based on the average order value and the conversion rate. In some embodiments, the computer-executable program code instructions further comprise program code instructions for calculating the conversion rate based on sales of the specified property or based on sales of the specified property and converted cross sales.

BRIEF DESCRIPTION OF THE DRAWINGS

Figure 1:
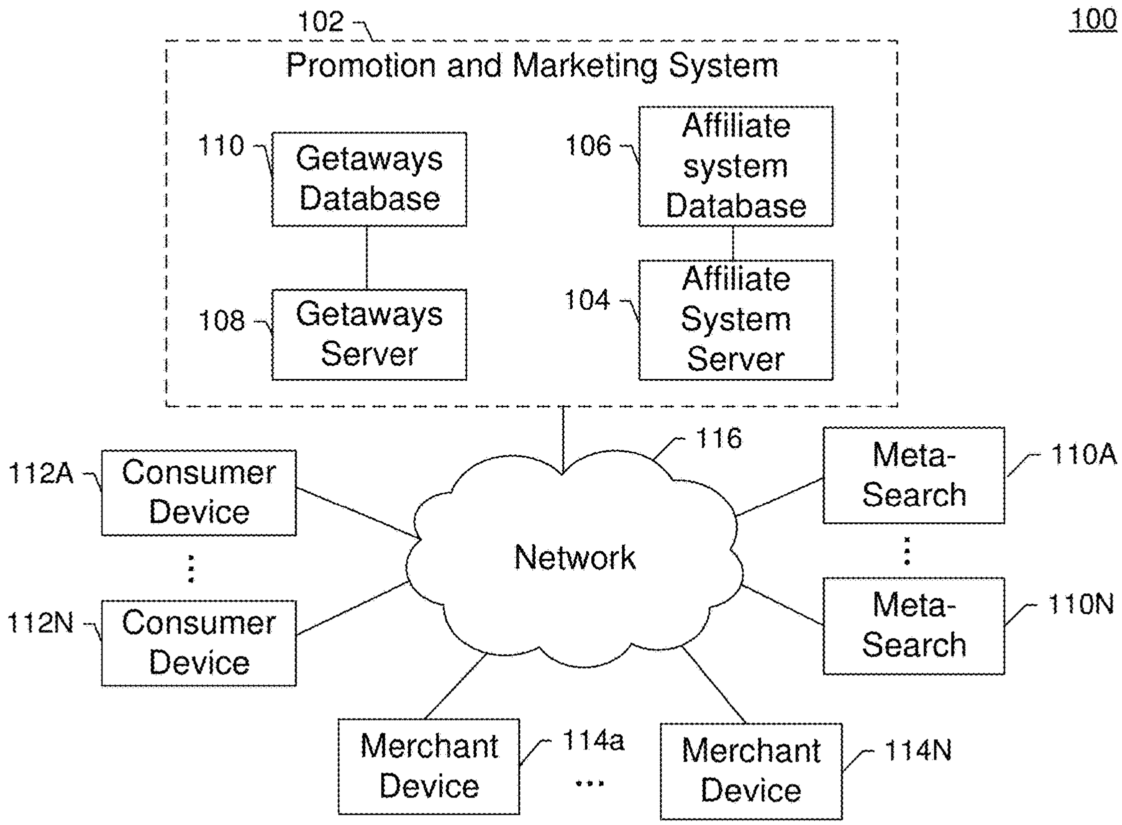
Figure 2:
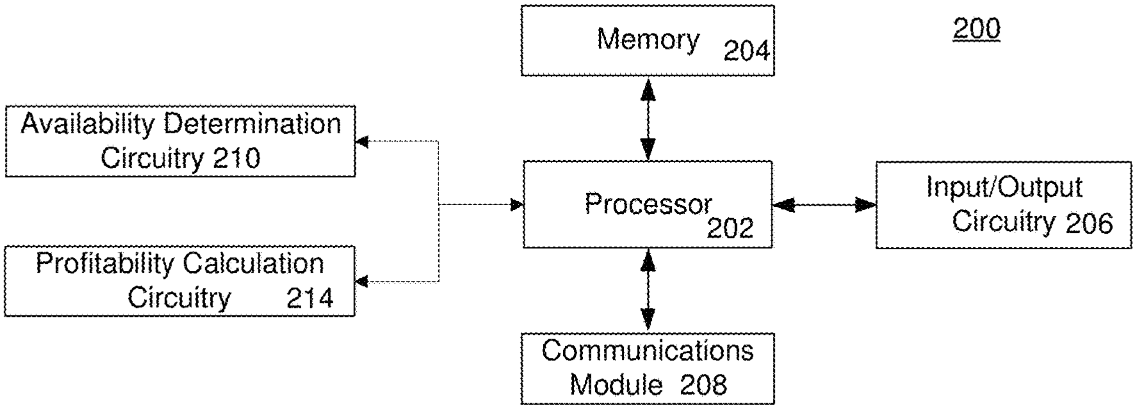
Figure 3:
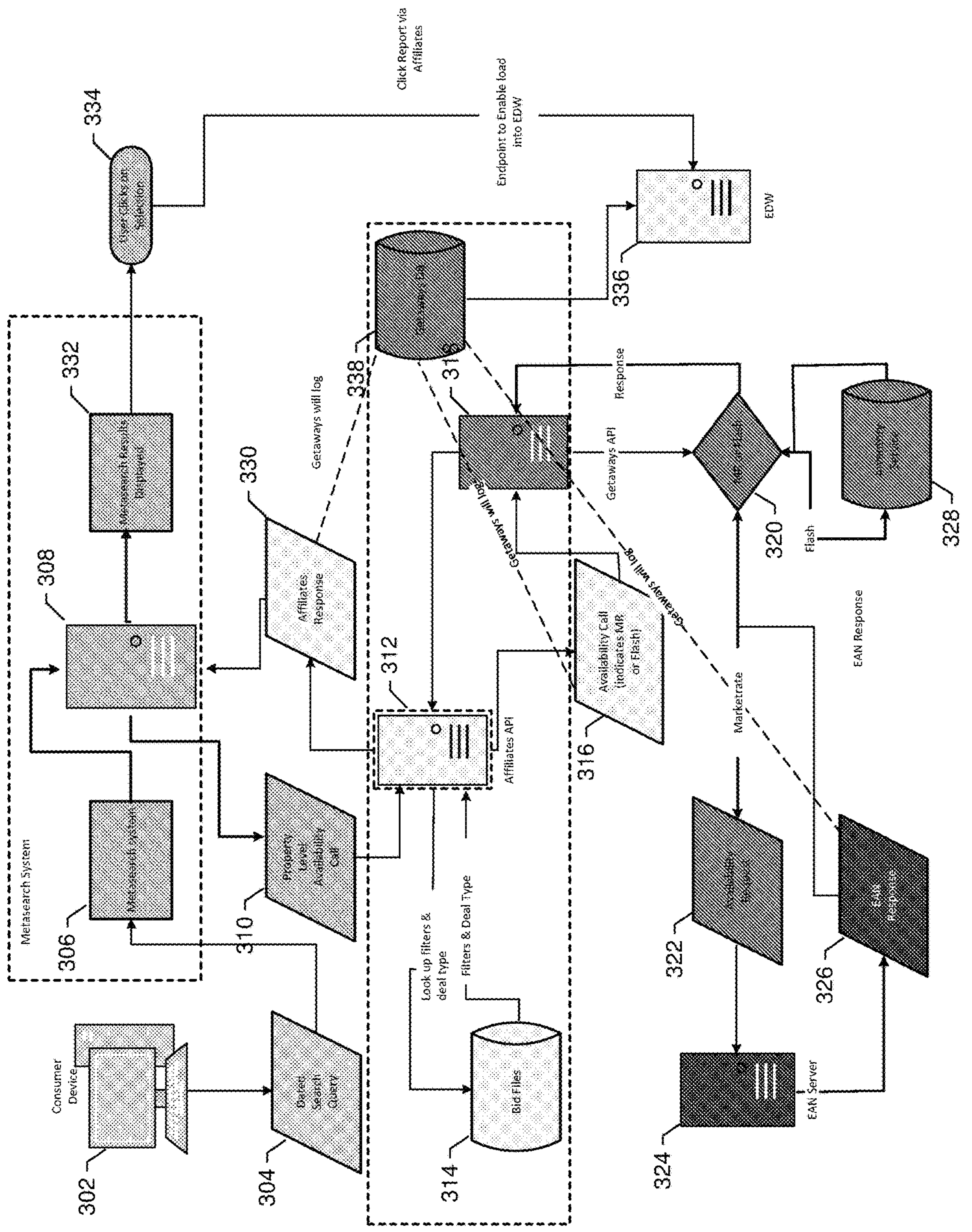
Figure 4:
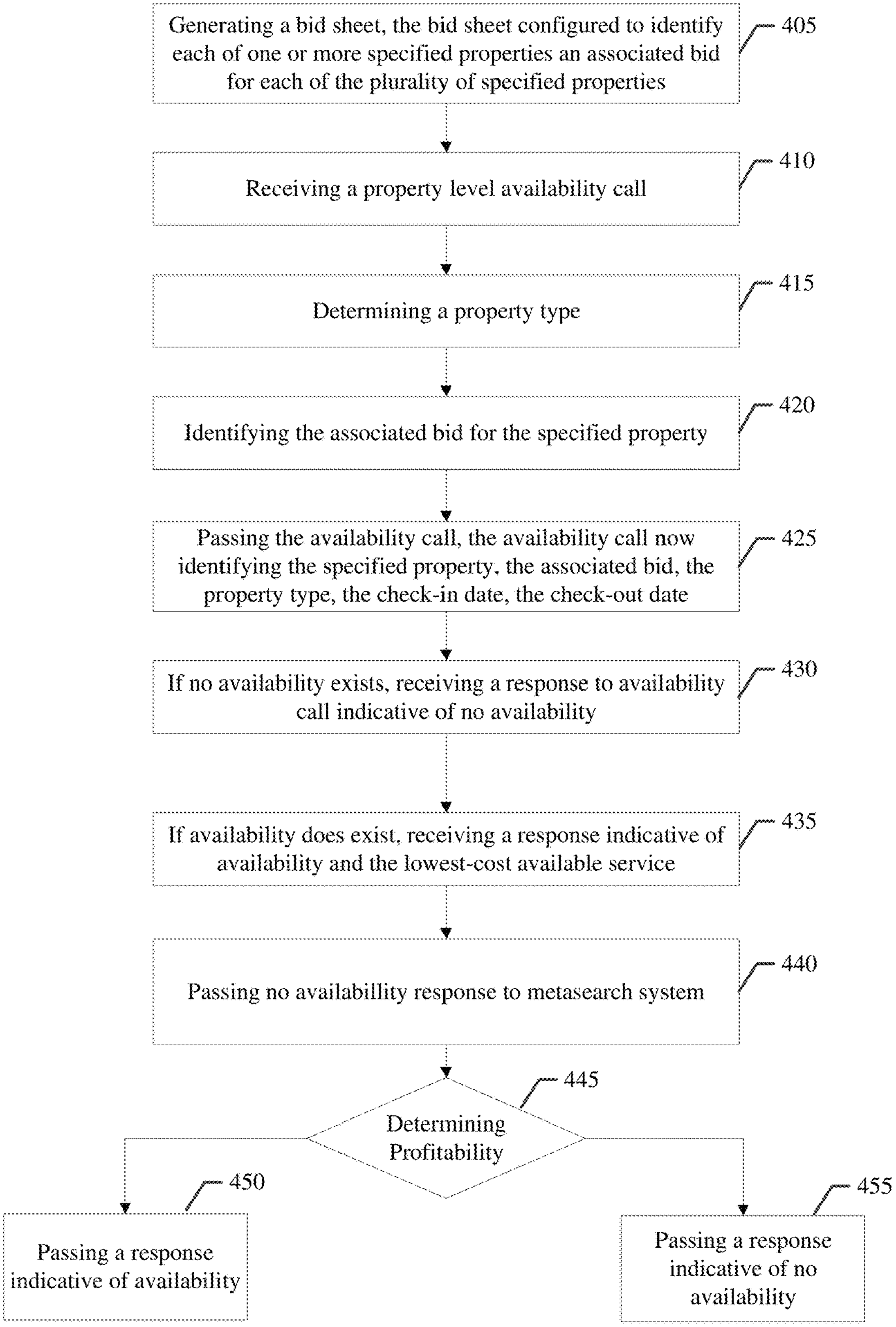
Figure 5:
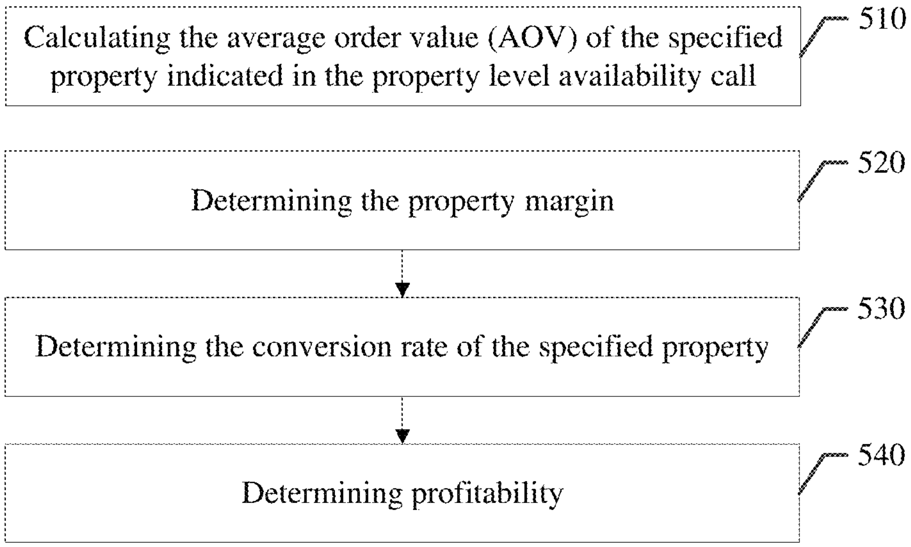
Figure 6:
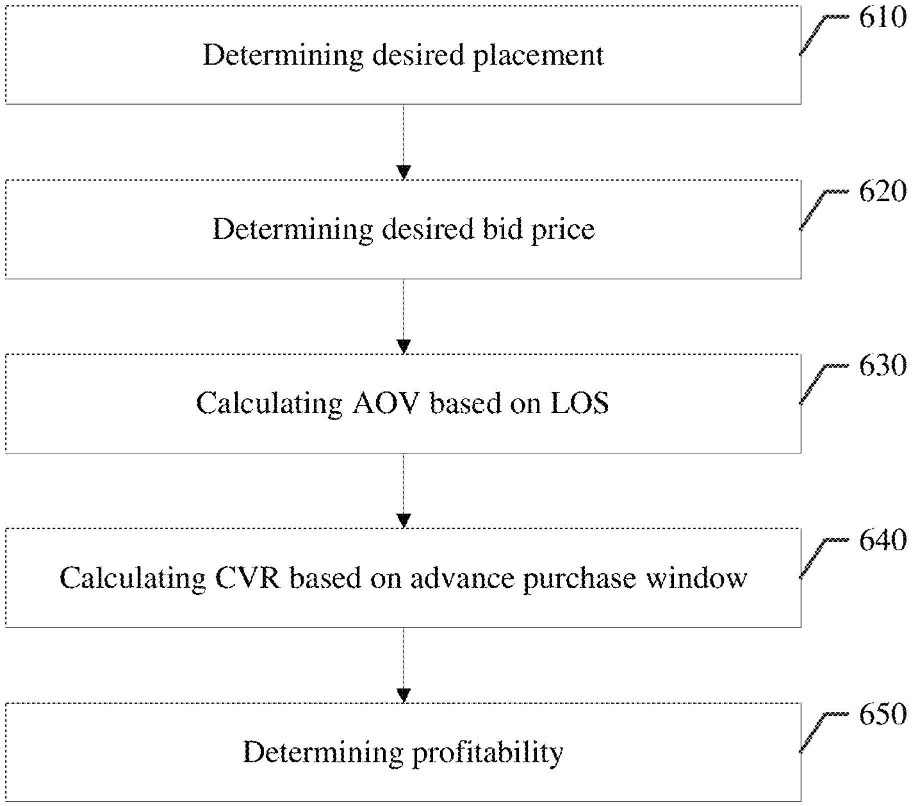
Figure 7:
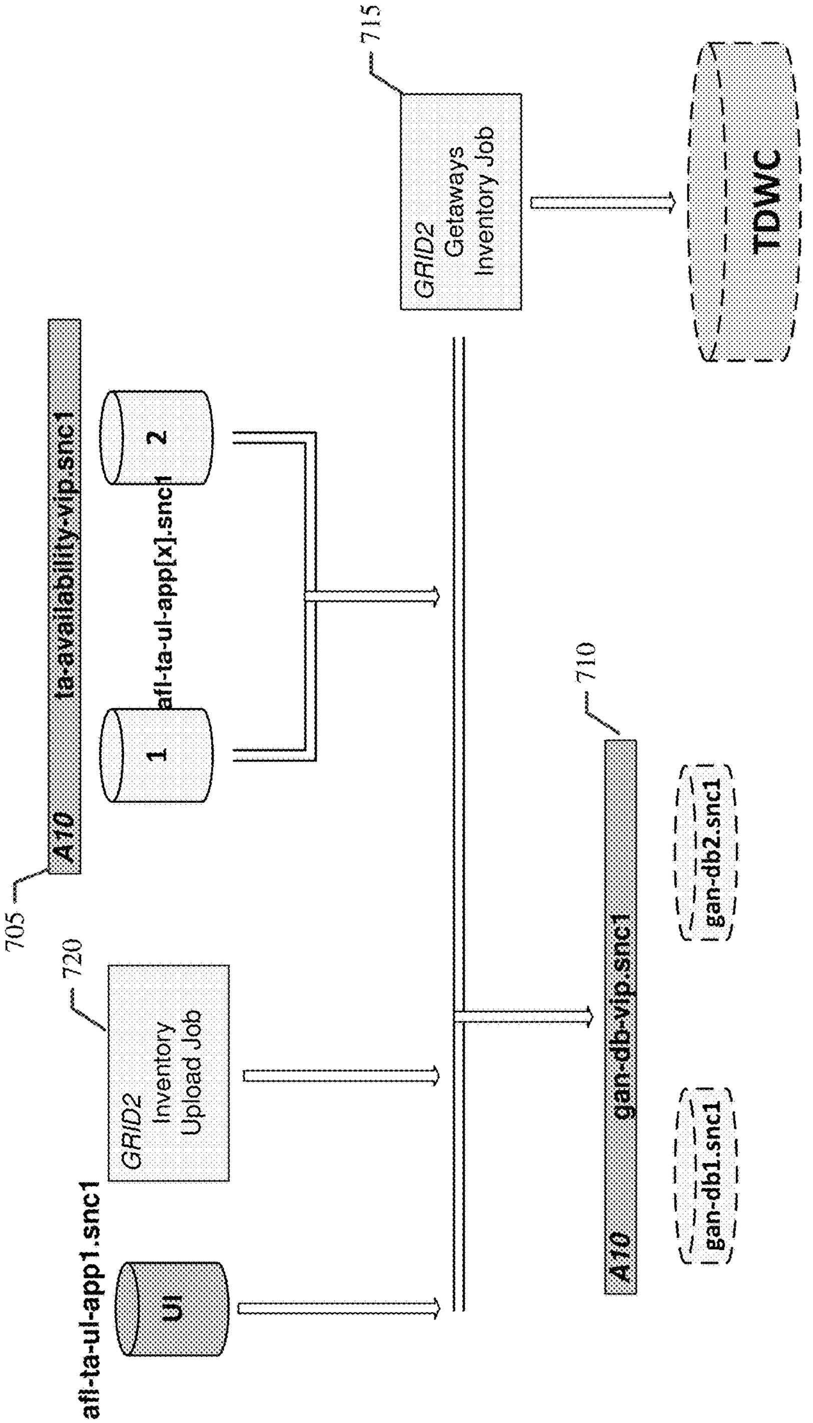
Figure 8:
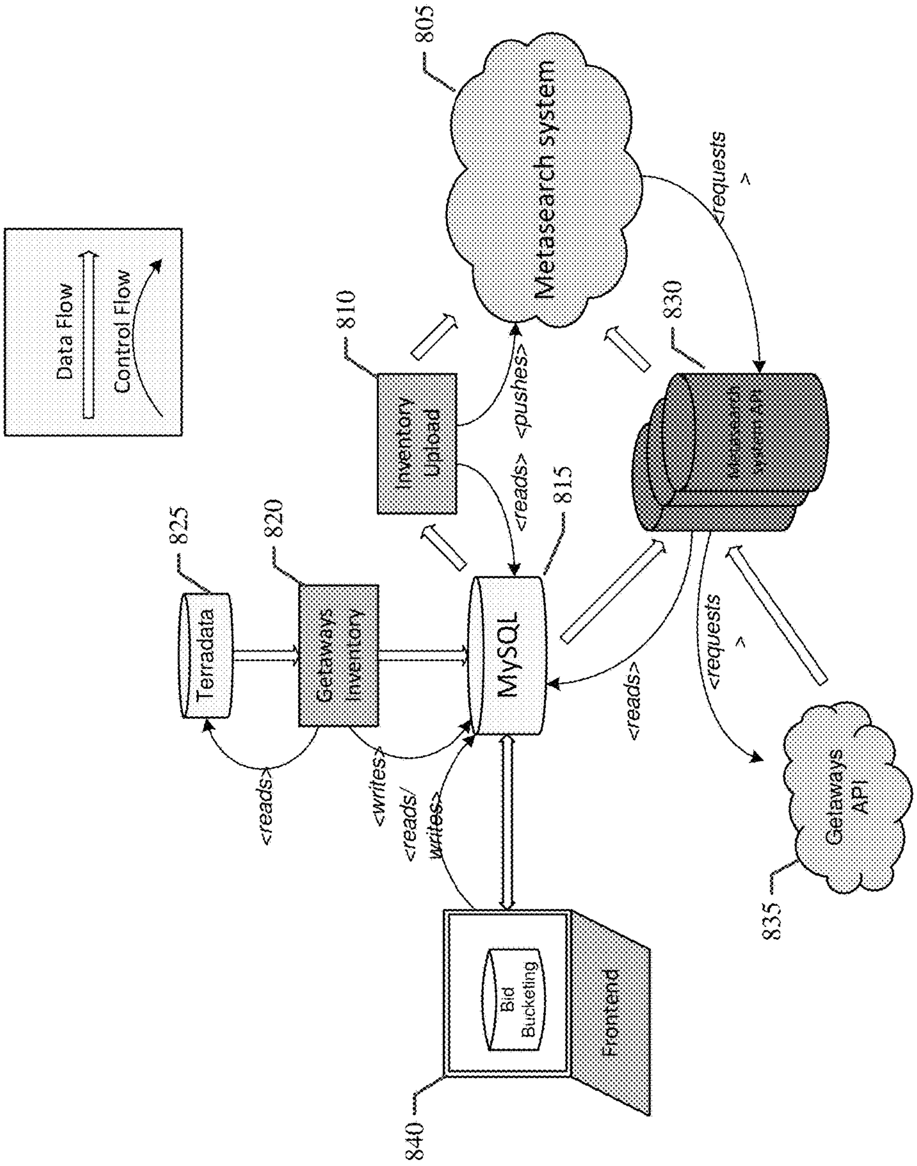

Having thus described some embodiments in general terms, reference will now be made to the accompanying drawings, which are not necessarily drawn to scale, and wherein:

FIG. 1 shows an example of a system in accordance with some embodiments;

FIG. 2 is a block diagram of an apparatus that may be specifically configured in accordance with an example embodiment of the present invention;

FIG. 3 shows an example data flow illustrating interactions between various devices of the system, in accordance with some embodiments;

FIG. 4 shows a flow chart of an exemplary method in accordance with some embodiments;

FIG. 5 shows a flow chart of an exemplary method in accordance with some embodiments;

FIG. 6 shows a flow chart of an exemplary method in accordance with some embodiments;

FIG. 7 shows an exemplary physical design for implementing embodiments of the present invention; and FIG. 8 shows an exemplary physical design for implementing embodiments of the present invention.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, some-times referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, a "metasearch system" may be a computer system, accessible over a network (e.g., the Internet), configured to receive "search requests" or "dated search queries" from consumers for services (e.g., travel reservations such as hotel stays, flights, rental cars, or the like), and further configured for searching multiple sources for information (e.g., relating to the service), aggregating the results from the multiple sources to identify, or otherwise obtain, for example, the lowest cost of the service, and displaying the results to the consumer.

As used herein, the term "consumer" should be understood to refer to a seeker or, in some embodiments, recipient of goods, services, promotions, media, or the like. Consumers may include, without limitation, individuals, groups of individuals, corporations, other merchants, and the like.

An affiliate network (e.g., Expedia® affiliate network (EAN)) may be any group of sellers or re-sellers authorized to offer for sale and/or sell goods, services or experiences originating from a source, such as a "merchant". The "affiliate network" may, in some embodiments, buy products (e.g., the goods, services, or experiences) at discounted or wholesale rates and sell or authorize or otherwise allow other to sell, those products for a profit. Additionally or alternatively, merchants may be able to join an affiliate network, and for a fee or commission, sell their product(s). As used herein, the term "affiliate system", may be an authorized reseller or indirect supplier (e.g., authorized to offer for sale and sell services owned by direct suppliers) that is consigned to sell the service. Affiliate systems are generally able to join affiliate networks by paying a fee or commission on any product (e.g., goods, services, or experiences) they are able to sell. The "affiliate API" is an interface through which interactions (e.g., requests, property level availability calls, responses, etc.) happen between the affiliate system and, for example, the affiliate network or the like.

The term "merchant" as used herein is the source of the products, that, for example, owns inventory of the goods, services, or experiences, and may include, but are not limited to, a business owner, consigner, shopkeeper, tradesperson, vendor, operator, entrepreneur, agent, dealer, organization or the like that is in the business of a providing a good, service or experience to a consumer, facilitating the provision of a good, service or experience to a consumer and/or otherwise operating in the stream of commerce.

As used herein, the terms "promotion and marketing system" and "online getaways system" may refer a particular affiliate system, configured for re-selling inventory provided via the affiliate system and, in some embodiments, further configured to sell exclusive discounted goods, services, and experiences.

As used herein, the term "bid" is an offer from an affiliate system to the metasearch (e.g., reflecting how much the affiliate system is willing to pay to expose a consumer to a specified property offered by the source. The bid is paid on a click-through basis (such that the bid amount is paid only when the consumer clicks on a link directed the consumer to a website of the affiliate system, thereby incentivizing the metasearch system to place links to affiliate systems with the highest bids in the most prominent (e.g., higher on a list) position.

As used herein, the term "bid sheet" may refer to a document or indication, from the affiliate system to the metasearch system, of particular services (e.g., specified properties) that the affiliate system would like to bid on and further includes the bids for each of the particular services. The bid sheet may comprise "bid buckets" identifying specified properties (e.g., each of the specified properties that the affiliate system would like to bid on at one bid price, and one or more other sets of specified properties that the affiliate system would like to bid on at a second bid price).

System Architecture and Example Apparatus

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 shows an example computing system within which embodiments of the present invention may operate. Consumers 112A-112N may access metasearch systems 110A-110N via a network 116 (e.g., the Internet, or the like) using consumer devices 112A-112N. The metasearch systems 110A-110N may access the promotion and marketing system 102 and merchants 114A-114N via network 116. Promotion and marketing system 102 may comprise affiliate system server 104 and affiliate system database 106 as well as getaways server 108 and getaways server 110.

The affiliate server 104 and getaways server 108 may be embodied as a single computer or multiple computers. Affiliate server 104 may provide for managing participation in meta-auctions. For example, affiliate server 104 may be operable to receive a property level availability call from a metasearch system 110, determine whether a response indicative of availability is profitable, and provide a response to the metasearch system 110 accordingly. Getaways server 108 may provide for receiving the property level availability call passed on from the affiliate server 104 with an indication of a property type and determining availability. For example, getaways server 104 may be operable to receive a property level availability call from a affiliate server 104 together with an indication that the specified property is a market rate property, generate an availability request to an affiliate network, and generate a response to the affiliate server 104 with the availability and other relevant information (e.g., type of room, and the like). Although the affiliate server 104 and getaway server 108 are shown, system 102 may include one or more servers.

Returning to FIG. 1, affiliate system database 106 and getaways database 110 may be embodied as a data storage device such as a Network Attached Storage (NAS) device or devices, or as a separate database server or servers. Affiliate system database 106 includes information accessed and stored by the affiliate system server 104 to facilitate the operations of the promotion and marketing system 102. For example, the affiliate system database 106 may include, without limitation, discreet services (e.g., specified properties), associated conversion rates, analytic results, reports, transaction data, and/or the like.

The consumer devices 112A-112N may be any computing device as known in the art and operated by a consumer. Electronic data received by the metasearch system 110A-110N from the consumer devices 112A-112N may be provided in various forms and via various methods. The consumer devices 112A-112N may include mobile devices, such as laptop computers, smartphones, netbooks, tablet computers, wearable devices (e.g., electronic watches, wrist bands, glasses, etc.), and the like. Such mobile devices may provide search requests or dated search queries to the metasearch systems 110A-110N and receive ordered, prioritized, and/or filtered results from the metasearch systems 110A-110N. In some embodiments, consumer devices 112A-112N may access promotion and marketing system 102 via, for example, a link provided by a metasearch system in response to a dated search query as part of an ordered, prioritized, and/or filtered result list displayed on a user interface of consumer device and receive targeted electronic marketing communications, rewards, incentives, etc. that are relevant to the ordered, prioritized, and/or filtered results and/or dated search query. Consumer devices 112A-112N may include wired or stationary devices such as desktop computers or workstations.

In embodiments where a consumer device 112 is a mobile device, such as a smart phone or tablet, the consumer device 112 may execute an "app" or "consumer application" to interact with the metasearch systems 110A-110N and/or promotion and marketing system 102. Such apps are typically designed to execute on mobile devices, such as tablets or smartphones, without the use of a browser. For example, an app may be provided that executes on mobile device operating systems such as Apple Inc.'s iOS®, Google Inc.'s Android®, or Microsoft Inc.'s Windows 8®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of consumers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

Various other types of information may also be provided in conjunction with an app executing on the consumer's mobile device. For example, if the mobile device includes a social networking feature, the consumer may enable the app to provide updates to the consumer's social network to notify friends of a particularly interesting promotion. It should be appreciated that the use of mobile technology and associated app frameworks may provide for particularly unique and beneficial uses of the promotion and marketing service through leveraging the functionality offered by the various mobile operating systems.

Additionally or alternatively, consumer device 112A-112N may interact through the promotion and marketing system 102, the affiliate system server 104, and/or the getaways server 108 via a web browser. As yet another example, the consumer devices 112A-112N may include various hardware or firmware designed to interface with the one or more metasearch systems 110A-110N, promotion and marketing system 102, the affiliate system server 104, and/or the getaways server 108 (e.g., where the consumer devices 112A-112N is a purpose-built device offered for the primary purpose of communicating with the one or more metasearch systems 110A-110N, promotion and marketing system 102, the affiliate system server 104, and/or the getaways server 108, such as a store kiosk).

The merchant devices 114A-114N may be any computing device as known in the art and operated by a merchant. For example, the merchant devices 114A-114N may include a merchant point-of-sale configured to facilitate transactions at the merchant shop.

Example Apparatus for Implementing Various Embodiments

The server 104, database 106, consumer device 108 or merchant device 110 may be embodied by one or more computing systems or devices, such as apparatus 200 shown in FIG. 2. As illustrated in FIG. 2, the apparatus 200 may include a processor 202, a memory 204, an input/output circuitry 206, communications circuitry 208, and availability determination circuitry 210, and profitability determination circuitry 214. The apparatus 200 may be configured to execute the operations described herein. Although these components are described with respect to functional limitations, it should be understood that the particular implementations necessarily include the use of particular hardware. It should also be understood that certain of these components may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 300 may provide or supplement the functionality of particular circuitry. For example, the processor 302 may provide processing functionality, the memory 304 may provide storage functionality, the communications circuitry 308 may provide network interface functionality, and the like.

In some embodiments, the processor 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may include a keyboard, a mouse, a joystick, soft keys, a microphone, motion sensor, touch screen, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

When circuitry 200 is implemented on, for example, affiliate system server 104, circuitry 200 may include the availability determination circuitry 210 and the profitability determination circuitry 214.

Circuitries 210 and 212 may utilize processing circuitry, such as the processor 202, to perform these actions. However, it should also be appreciated that, in some embodiments, circuitries 210 and 212 may include a separate processor, specially configured field programmable gate array (FPGA), or application specific interface circuit (ASIC). Circuitries 210 and 212 may therefore be implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by the example displays discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Data Flow

FIG. 3 depicts an example data flow 300 illustrating interactions between a consumer device, for example, one of consumer devices 112A-112N, a metasearch system such as one of metasearch systems 110A-110N, and promotion and marketing system 102 including the affiliate system server 104, affiliate system database 106, getaways server 108, and getaways database 110. The data flow 300 illustrates how electronic information may be passed among various systems in accordance with embodiments of the present invention.

At step 302, a consumer, operating for example, consumer device 110 accessing the metasearch system via a network, receiving a user interface configured to receive a search, and at step 304, a dated search query is generated and transmitted. At step 304, the dated search query is received at metasearch system. Metasearch system accesses metasearch server 304. At 308, metasearch server may then determine which services (e.g., which particular hotels, flights, rental cars, or the like) are relevant to the dated search query 302 (e.g., the Times Square Marriot for a dated search query for hotels stays in New York, NY) and those affiliates having expressed their desire to provide inventory of the services. Metasearch server 304 then performs a property level availability call 310 to those affiliates and in particular, to the affiliate system server 104.

The property level availability call is performed via, for example an affiliate system API. The affiliate system, in accordance with one embodiment of the present invention, may access, at 314, the bid files related to the particular service(s) identified in the property level availability call. For example, if the metasearch server identifies a first hotel, a second hotel, and third hotel that are relevant to the dated search query and that the affiliate has expressed a desire to provide the inventory for each, the affiliate system may perform a GET to, for example, the affiliate system database, which may store bid information, access the related bids associated with those hotels. In some embodiments, the bids are made on a per hotel basis and in the form of a cost-per-click (CPC). In some embodiments, a plurality of bid files may be generated and therefore accessed in accordance with whether the request originated via the web (e.g., World Wide Web) or a web app. Additionally or alternatively, a plurality of bid files may be generated and therefore accessed in accordance with whether the request originated from a particular geographic location (e.g., a particular country, state, county, city, neighborhood, or the like) or a second particular geographic location (e.g., outside US or a different articular country, state, county, city, neighborhood, or the like).

The affiliate system may then pass an availability call 316 to the getaways system, via, for example, a getaways API 318 indicating the particular services (e.g., the specified properties), the associated bids, and, in some embodiments, an indication whether the particular service is a market rate (MR) service or a flash service. In some embodiments, the affiliate system will pass through, for example, all availability calls received and pre-compute the filtered responses to bundle with the final response which will be the long pull. In some embodiments, affiliate system may include the following additional parameters on the availability call to getaways system: API call UUID, deal type (booking or market rate), and partner_id. In some embodiments, an MR service, as used herein, identifies a service as an affiliate network service, meaning the ability to provide the service is not exclusive to the promotion and marketing system, the affiliate system, or online getaways system and can be provided by other providers in the affiliate network. In contrast, booking or "flash" service identifies a service as exclusively provided by the online getaways system.

The online getaways API receives, at step 318, the availability call and determines, at step 320, what action to take based on whether the service is a MR service or a flash service. That is, the getaways system may add logic to call EAN for market rate and inventory for booking deals. In the event that the service is an MR service, the getaways API performs, at 322, an availability request to an affiliate network server 324, which then determines the availability of the MR service and passes a response, at step 326, back to the getaways server, via for example the getaways API. The getaways server may compute which available room type option is cheapest and respond to the affiliate system API (e.g., the response may include the room type). In the event that the particular service is a flash service, the getaways server may access, at step 328, an inventory service database and determines the availability of the flash service.

The online getaways server may then provide a response back to the affiliate server. While often inventory is available, responding in the affirmative and therefore participating in the metasearch auction may not be in the promotion and marketing system's best interest. For example, for an MR service (e.g., a hotel stay available for sale by a plurality of affiliates in the affiliate network), each of the plurality of affiliates may be able to provide the same or an equivalent room at exactly the same or near the same rate. Moreover, the promotion and marketing system may be contractually obligated to share a portion of the margin with the affiliate network inventory provider (e.g., Expedia® or the like). As such, a determination may be made regarding the profitability of rendering an affirmative availability. If the service is available, yet not profitable or likely to be profitable, some embodiments of the present invention may be configured to not respond, delay a response, or respond in the negative, each of which, practically, precludes participation in the meta-auction. Whereas, if the service is available and is profitable, or is likely to be profitable (and/or meets a profitability threshold), some embodiments of the present invention may be configured to provide an affirmative response and as such, participate in the meta-auction.

The affiliate response is then passed, at 330, to the metasearch system. The responses from, for example, each of a plurality of affiliate providers, are aggregated and ordered by the metasearch server and displayed, at step 332, to the consumer. The consumer may then click a selection, thus causing a click report to be generated and transmitted to enterprise data warehouse (EDW) at 336, the EDW configured for reporting and data analysis. As shown, the EDW acts a repository of integrated data from one or more disparate sources (e.g., the EAN response, the affiliate's availability call, and the affiliate's response). Storage of current and historical data may be used for creating analytical reports, which may include, for example, daily, weekly, quarterly, and/or annual comparisons and trends in one or more metrics (e.g., conversion rate of specified properties, or, for example, one or more conversion profiles identifying conversion rate by specified property, environment (e.g., web or mobile app), originating location, etc.). Throughout the process, the online getaways database logs information analytic use, which may also be transmitted to or accessed by the EDW. For example, the online getaways database may log the number of API calls received, the clicks received, and the conversion rate of the clicks.

The getaways server may stand up a DB that logs the three main API responses (e.g., affiliate system API call, EAN availability response, and affiliate system response to metasearch system). EDW may then query the getaways database to load content into the four primary tables, whereas a click table may still come from affiliate system.

Exemplary Operation for Implementing Embodiments of the Present Invention

In some embodiments, apparatus 200 may be configured to determine availability of a particular service and whether participating in a meta-auction is likely to be profitable. FIGS. 4-6 illustrate exemplary processes for determining whether to participate in the meta-auction.

Receiving an Availability Call

FIG. 4 illustrates a flow diagram depicting an example of a process 400 for receiving an availability call in accordance with embodiments of the present invention. The process illustrates how, upon reception of the availability call, a promotion and marketing system, an online getaways system, or an API related thereto may identify a type of service, an availability of the service, and whether to compete in the meta-auction based on a likelihood of profitability calculation. The process 400 may be performed by an apparatus, such as the apparatus 200 described above with respect to FIG. 2.

As shown in block 405 of FIG. 4, an apparatus, such as apparatus 200, may be configured for generating a bid sheet, the bid sheet configured to identify each of one or more potential responses (e.g., specified properties, flights, or the like) to service requests and an associated bid for each of the plurality of potential responses. In some embodiments, the bid sheet may identify a plurality of properties that may be returned in response to a service request for a hotel room in a particular area, each of the plurality of properties available to be provided by the online getaways or promotion and marketing system. For example, the bid sheet may identify a first hotel and second hotel in New York, NY, each of which may be returned for example, in response to a search request from the consumer.

The bid sheet may be updated and/or generated in advance of a predefined time frame (e.g., hourly, daily, weekly, or the like). The bid sheet, once updated and/or generated, may be configured for upload or uploaded to a metasearch server or database or the like. In some embodiments, a plurality of bid files may be generated and/or uploaded in accordance with whether the request originated via the web (e.g., World Wide Web) or a web app. Additionally or alternatively, a plurality of bid files may be generated and uploaded in accordance with whether the request originated from a particular geographic location (e.g., a particular country, state, county, city, neighborhood, or the like) or a second particular geographic location (e.g., outside US or a different articular country, state, county, city, neighborhood, or the like).

Subsequent to uploading the bid sheet (or bid sheets) to for example, the metasearch server, the metasearch system may receive, from a consumer (e.g., operating a consumer device), a dated search query. The dated search query may identify a particular service, and in some embodiments, a location, a check in date, and a check out date. For example, the consumer may submit a dated search query for a hotel stay in New York City for Oct. 15, 2015-Oct. 17, 2015. The metasearch server may then identify, by way of bid sheets received from each of a plurality of service suppliers, which service suppliers may be queried for availability.

Having been identified as desiring to bid for the specified service (e.g., the specified property), as shown in block 410 of FIG. 4, an apparatus, such as apparatus 200, may be configured for receiving a property level availability call. In some embodiments, the property level availability call may be configured to identify at least a specified property (e.g., that the metasearch system has identified as a potential response to the dated search query) and the specified dates (e.g., Oct. 15, 2015-Oct. 17, 2015). In some embodiments, the property level availability call may further be configured to elicit a response identifying an availability (or, in some embodiments, unavailability) of the specified property for the specified dates.

Upon reception of the property level availability call, the promotion and marketing system, the affiliate system and/or online getaways system may identify a property type of the specified property. As shown in block 415 of FIG. 4, an apparatus, such as apparatus 200, may be configured for determining a property type and/or whether the specified property is a MR type property or a flash type property.

Also upon reception, as shown in block 420 of FIG. 4, an apparatus, such as apparatus 200, may be configured for identify the associated bid for the specified property (e.g., $1). As shown in block 425 of FIG. 4, an apparatus, such as apparatus 200, may be configured for passing or generating an availability call to, for example, the online getaways API, identifying the specified property, the associated bid, the property type, the check-in date, the check-out date, and, in some embodiments, other information (as shown below).

Exemplary fields in the API call are shown in the table below:

| Field Name | Sample Value | Description |
|---|---|---|
| log_date | Sep. 10, 2014 | date |
| log_time | Sep. 10, 2014 09:15:20.000000 | time stamp |
| product_type | booking | product type |
| check_in | Oct. 15, 2014 | check in date |
| check_out | Oct. 17, 2014 | check out date |
| adult_count | 2 | number of adults |
| child_ages | 0 | age of children |
| deal_position | 2 | position in tripadvisor search |
| deal_id | ga-bk-best-western-executive-inn-suites-3 | deal id from bid sheet |
| destination_id | New York, NY | mapped from deal id |
| partner_id | TripAdvisor | partner name |
| uuid | f89d861c-957a-11e2-83f0-0025906a9220 | UUID for API call |

As can be seen, the date and time may be logged, as well as consumer provided information such as the check-in and check-out dates, number of adults, children, their ages, the ID from the bid sheet. The affiliate API may, in some embodiments, append or otherwise add the destination that was searched that identified the specified property (e.g., New York, NY, Manhattan, NY, or just plain New York all may identify the Times Square Marriot), the metasearch system from which the property level availability call was received, and a unique ID (e.g., the UUID) to identify, for example, that each of a plurality of property level availability calls each came from the same query.

The getaways server may then, depending on the property type, determine if availability exists by, for example, making an availability request to an affiliate network server in the event the specified property is a MR type property. In some embodiments, the getaways server may further be configured for making an availability request to an inventory service in the event the specified property is a flash type property. If the property is unavailable, a response may be generated and transmitting indicating as much. Accordingly, as shown in block 430 of FIG. 4, an apparatus, such as apparatus 200, may be configured for, in an instance in which no availability exists, receiving a response indicating that no availability exists.

In the property is available, as shown in block 435 of FIG. 4, an apparatus, such as apparatus 200, may be configured for receiving a response to the availability request indicative of availability and, in some embodiments, an indication of, for example, the lowest-cost service (e.g., room, room type or the like at the specified property).

In the event of no availability, as shown in block 440 of FIG. 4, an apparatus, such as apparatus 200, may be configured for responding to the property level availability call from the metasearch system with a response indicative of no availability and as such, the apparatus will not participate in the meta-auction.

In the event that availability does exist, a determination may be made as to whether to respond such that the system identifies that the specified property is available for the specified check in date to check out date or whether to response such that the system (1) indicates that the specified property is not available for the specified check in date to check out date, (2) delays the response indicating that the specified property is available for the specified check in date to check out date, or (3) does not respond. Each effectively, removes the system's participation in the meta-auction. Accordingly, as shown in block 445 of FIG. 4, an apparatus, such as apparatus 200, may be configured for, in an instance in which availability exists, making a profitability determination.

If the profitability determination yields a result indicative that profitability is expected, likely, or the like, as shown in block 450 of FIG. 4, an apparatus, such as apparatus 200, may be configured for responding to the property level availability call from the metasearch system with an indication of availability. In contrast, if the profitability determination yields a result indicative that profitability is not expected, not likely, or the like, as shown in block 455 of FIG. 4, an apparatus, such as apparatus 200, may be configured for responding to the property level availability call from the metasearch system with an indication of no availability.

As such, when a response is made indicative of availability, the specified property may then be displayed by the metasearch system, the existence and/or the position of the specified property in the displayed results list may be in accordance with the bid amount. For example, the higher the bid amount, the higher or prominently positioned the promotion and marketing system will be displayed, and the more likely the consumer will click on the specified property. Once the consumer clicks on the specified property, the promotion and marketing system, affiliate system, and/or online getaways system may then pay the cost-per-click, for example, in the amount of the bid amount. The consumer may or may not purchase the specified property and/or other relevant goods, services, or experiences provided by the promotion and marketing system and/or online getaways system.

Making a Likelihood of Profitability Calculation

FIG. 5 illustrates a flow diagram depicting an example of a process 500 for making a determination as to whether to respond such that the system identifies that the specified property is available for the specified check in date to check out date in accordance with embodiments of the present invention. The process illustrates how, upon a calculation of, for example, a likelihood of profitability, a promotion and marketing system, an affiliate system, and/or a getaways system may determine whether to participate in the meta-auction. The process 500 may be performed by an apparatus, such as the apparatus 200 described above with respect to FIG. 2.

In the broadest sense, given that the bid price is fixed, those meta-auctions for placement in response to searches with, for example, increased length of stays yield more profitability. Specifically, given a bid of $1, a property margin of $20/night, and a single night length of stay, the affiliate system must convert more than 5% to be profitable. Whereas, given a bid of $1, a property margin of $20/night, and a five night length of stay, the affiliate system must only convert more than 1% to be profitable. As such, for specified properties where a conversion rate is less than 5% but more than 1%, the affiliate system may be configured to participate in the meta-auctions for the exemplified five night stay, but not for the one night stay. Moreover, given a known conversion rate, when a property level availability call is received, profitability may be determined based on, for example, length of stay.

Accordingly, as shown in block 510 of FIG. 5, an apparatus, such as apparatus 200, may be configured for calculating the average order value (AOV) of the specified property indicated in the property level availability call. Calculation of the AOV may comprise identifying the length of stay (LOS) from the property level availability call and the price per night, as received from the getaways server via an availability call to the affiliate network, for a market rate property or the inventory service for a flash property. Subsequently multiplying the two values equals the AOV. For example, a one night stay at $200/night has an AOV of $200 and a five-night stay at $200/night has an AOV of $1,000.

As shown in block 520 of FIG. 5, an apparatus, such as apparatus 200, may be configured for determining the property margin. Determining the property margin may, in one embodiment, be based on the margin of the particular search or, in other embodiments, be based on a weighted average value of items sold from clicks on the meta-placements for this specified property. For example, in an instance in which the property margin for the Times Square Marriot is determined, if the consumer clicks on, for example, the Times Square Marriot and is brought to a website of the online getaways system and may, in addition to or alternatively, purchase a stay at a different midtown hotel, for example a flash type property offering a better value and/or other goods provided as relevant to the consumer and/or consumer search (e.g., tickets to a Broadway show or the like). The property margin may be, for example, 5%, meaning that for an AOV of $1,000, the property margin (in dollars) would be $100, whereas for a one-night stay, the property margin would be $20.

As shown in block 530 of FIG. 5, an apparatus, such as apparatus 200, may be configured for determining the conversion rate (CVR). The CVR may be determined based on, for example, specified property sales plus cross sells, the sum of divided by clicks. For example, a conversion rate may be in the order of 5% or 0.05. Return on Sales (ROS) may be a fixed value. The table below identifies an exemplary combination of static and run time values which may be combined into a formula that allows the system to calculate minimum thresholds for the run time values to enable the system to economically achieve certain bid minimums.

| Key Value | Static/Run Time | Value Calculation |
|---|---|---|
| Average Order Value (AOV) | Run time | Length of stay X Price/Night |
| Property Margin (PM) | Static | Weighted average value of items sold from clicks on the meta placements for this property |
| Conversion Rate (CVR) | Static | (Hotel sales + cross sells)/ Hotel clicks |
| Return on Sales (ROS) | Static | Fixed value set by marketing |

As shown in block 540 of FIG. 5, an apparatus, such as apparatus 200, may be configured for determining profitability by for example, utilizing the LOS, AOV, property margin and conversion rate. While conversion rate is shown as a static variable, it may be updated daily, weekly, monthly, etc. based on an observed, inferred, or otherwise calculated basis in accordance with, in some embodiments, just the specified property, or in other embodiments, more information, such as for example, any combination of whether the request originated via the web (e.g., world wide web) or a web app, whether the request originated from a particular geographic location (e.g., a particular country, state, county, city, neighborhood, or the like) or a second particular geographic location (e.g., outside US or a different articular country, state, county, city, neighborhood, or the like), an advance purchase window (e.g., how far out the dated search query is from the present date), how broad the location search is/was (e.g., a conversion rate for a specified property (e.g., the Time Square Marriot) may be higher when the searched location is more refined (e.g., a specified zip code versus New York, NY).

In some embodiments, given the static nature of each of the variables except LOS, the apparatus may be configured for identifying the LOS and whether the LOS identified in the property level availability call results in profitability given the formula:

$$\text{Bid Price} = AOV * PM * CVR * ROS$$

Enforcing Property Level Profitability

FIG. 6 illustrates a flow diagram depicting an example of a process 600 for enforcing property level profitability by auto-adjusting the desired bid price based on a desired placement in accordance with embodiments of the present invention. The process illustrates how, preceding property level availability call, a promotion and marketing system or online getaways system may use one or more metrics to enforce property level profitability. The process 600 may be performed by an apparatus, such as the apparatus 200 described above with respect to FIG. 2.

As such the proposed algorithm may identify a desired bid price by property and establish minimum run time thresholds to ensure participation is economically viable. As such the formula looks as follows:

$$\text{Desired Bid Price} = AOV * PM * CVR * ROS$$

In some embodiments, PM, CVR, and ROS may be static values that are be set in advance and the desired Bid Price is be adjusted based on the desired placement the system is interested in obtaining. The metrics may then be used to enforce property level profitability by auto adjusting the desired bid price based on the desired placement and influencing the response to the property level availability call.

In some embodiments, the system may manage participation in metasearch using both availability and, for example, Length of Stay, Property Margin & Overall Price. Additionally or alternatively, the system may be configured to leverage additional run time signals like advance purchase window (e.g., how far out the dated search query is from the present date), as well as, pre-computed values on the specified property such as deals or promotions available for cross sell, and conversion rate. The use of the additional signals may enable the system to more finely tune participation in metasearch and as more data is gathered, the system may be able to incorporate, for example, year over year seasonal elements.

In an exemplary embodiments as shown in process 600, as shown in block 610 of FIG. 6, an apparatus, such as apparatus 200, may be configured for determining desired placement. For example, higher placement may increase the likelihood of a consumer clicking the system's bid. Placement is a function of the meta-auction, wherein the higher the bid, the higher or more prominently the placement. As shown in block 620 of FIG. 6, an apparatus, such as apparatus 200, may be configured for determining a desired bid price. Where competitors are calculating bid price based on a weighted average stay (e.g., the average requested stay at the Time Square Marriot is 2.2 nights), the competitors may calculate a bid based on their predicted conversion rate and property margin (each of which may be higher or lower than those of the promotion and marketing system.) To that end, the promotion and marketing system may out bid (by observing placement versus the competitors and increasing their bid until reaching the desired placement, for example.)

As shown in block 630 of FIG. 6, an apparatus, such as apparatus 200, may be configured for extracting or identifying the LOS from the property level availability call and calculating the AOV. Moreover, in some embodiments, as shown in block 640 of FIG. 6, an apparatus, such as apparatus 200, may be configured for calculating the conversion rate (or estimated conversion rate) based on the advance purchase window. That is, analytic data provides that particular advance purchase windows exist in which a consumer is more likely to purchase a request or searched for service. For example, if a consumer were to submit a dated search query indicating a check-in date and check-out date four weeks into the future, the estimated (based on observed conversions for example) may be a first conversion rate, whereas if a consumer were to submit a dated search query indicating a check-in date and check-out date eight days into the future, the estimated conversion rate may be a second conversion rate, the second conversion rate being higher than the first conversion rate, indicating that a consumer is more likely to purchase at eight days out than four weeks out.

As shown in block 650 of FIG. 6, an apparatus, such as apparatus 200, may be configured for determining profitability with a desired bid placement and a desired bid price based on the LOS and the advance purchase window as identified in the property level availability call.

Exemplary Hardware Deployment for Implementing Embodiments of the Present Invention FIG. 7 shows an exemplary physical design for implementing embodiments of the present invention.

Based on the requirements, the system was separated into two distinct applications 705 and 710 (the first application 705, for example, to implement the high-availability metasearch system (e.g., TripAdvisor®) API and the second application, for example 710, to allow the Affiliate Managers to select bid buckets for, for example, Getaways Deals to be uploaded to a metasearch system (e.g., TripAdvisor®) in form of an inventory file). In addition, two GRID2 jobs are shown 715 and 720—the first 715 to populate the intermediate database with inventory (e.g., all Getaways inventory) (query Teradata® and insert into MySQL), the second 720 to read from MySQL as CSV and SFTP to a metasearch system (e.g., TripAdvisor®).

Exemplary Physical Design for Implementing Embodiments of the Present Invention FIG. 8 shows an exemplary physical design for implementing embodiments of the present invention.

It was designed that the TripAdvisor API implementation will be designed on load-balanced VMs and will be horizontally scalable. Initially, the application will be deployed to afl-ta-app[1-2].snc1, the vip will be ta-availability-vip.snc1. The Bid Bucketing Frontend application is low-volume and thus will be deployed to a single (non-redundant) VM afl-ta-ui-appl.snc1. The data pipelines may be scheduled using the GRID2 system.

Returning now to FIG. 8, inventory upload 810 pushes, for example, data indicative of inventory to metasearch system 805. The inventory is read from MySQL 815, which is written from a getaways inventory app 820 which performs a read operation on terradata 825 to access the inventory information. Metasearch system 805 may request, via metasearch system API 830, which then requests, via getaways API 935. The requested information is then returned to the metasearch API 830 and subsequently returned to metasearch system 805. The metasearch API may also be configured to perform a read operation on MySQL 815 for, for example, information related to inventory, which is then returned in response to the request. MySQL is, at least in part, populated by the frontend 840 which is able to perform read and write operations indicating bid bucketing.

Exemplary Table Structures Utilized in Some Embodiments of the Present Invention API Calls—Key Fields:

| Field Name | Sample Value | Description |
|---|---|---|
| log_date | Sep. 10, 2014 | date |
| log_time | Sep. 10, 2014 09:15:20.000000 | time stamp |
| product_type | booking | product type |
| check_in | Oct. 15, 2014 | check in date |
| check_out | Oct. 17, 2014 | check out date |
| adult_count | 2 | number of adults |
| child_ages | 0 | age of children |
| deal_position | 2 | position in tripadvisor search |
| deal_id | ga-bk-best-western-executive-inn-suites-3 | deal id from bid sheet |
| destination_id | New York, NY | mapped from deal id |
| partner_id | TripAdvisor | partner name |
| uuid | f89d861c-957a-11e2-83f0-0025906a9220 | UUID for API call |

API Response Values—Key Fields (Affiliates to Log):

| Field Name | Sample Value | Description |
|---|---|---|
| log_date | Sep. 10, 2014 | date |
| log_time | Sep. 10, 2014 09:15:20.000000 | time stamp |
| product_type | booking | product type |
| deal_id | ga-bk-best-western-executive-inn-suites-3 | deal id from bid sheet |
| response | YES/NO | yes/no response |
| reason | TBD | code for NO*-NULL for YES |
| price | $150.12 | total price returned (if YES) |
| partner_id | TripAdvisor | partner name |
| uuid | f89d861c-957a-11e2-83f0-0025906a9220 | UUID for API call |

EAN Response Values—Key Fields:

| Field Name | Sample Value | Description |
|---|---|---|
| id | radisson-hotel-seattle-airport | Hotel name |
| uuid | f89d861c-957a-11e2-83f0-0025906a9220 | Hotel UUID |
| net | 9678 | total price in cents |
| currencyCode | USD | currency code |
| tax | 1402 | tax amount in cents |
| date | 2014 Jan. 1 | date of room night |
| title | 1 King Bed | room type |
| details | 1 King sleep number bed by select . . . | description of room |

-continued

| Field Name | Sample Value | Description |
|---|---|---|
| Cancellation Policy | Hotel cancellation made on or after Dec. 15, 2013 will be subject to a fee of $100 | cancellation policy |
| CRSPolicy | Hotel policy. You must bring a photo ID . . . | checkin procedures (?) |
| roomToken | f9c361ae-8d7c-4636-b4ee-bd2081adc8e8 | room id |
| isRefundable | true | refundability status |
| destination_Id | New York, NY | mapped from hotel id |
| partner_id | TripAdvisor | partner name |
| uuid | f89d861c-957a-11e2-83f0-0025906a9220 | UUID for API call |

It should be noted that this response will return all the available room types for that date range and we will return the cheapest one to the meta provider. For the purpose of this exercise we will only log the cheapest room type response, but we will need each day level detail as nightly prices are returned for each night in a stay.

CONCLUSION

Many modifications and other embodiments will come to mind to one skilled in the art to which these embodiments pertain having the benefit of the teachings presented in the foregoing descriptions and the associated drawings. For example, while the image cleanup, logo identification, and text extraction techniques are discussed herein with respect to an image of a receipt, they may be extended to other types of degraded documents. Degradation may refer to image quality, such as may be caused by variances in camera quality, camera placement (e.g., distance, gaze angle), lighting, image skew, document quality for OCR (e.g., folding, crumpling, non-optimal fonts, etc.). Therefore, it is to be understood that embodiments and implementations are not to be limited to the specific example embodiments disclosed and that modifications and other embodiments are intended to be included within the scope of the appended claims. Although specific terms are employed herein, they are used in a generic and descriptive sense only and not for purposes of limitation.

The invention claimed is:

1. A method for improving efficiency of a meta-search system by reducing participation in meta-auctions, the method comprising:

receiving, by one or more processors, a property level availability call configured to elicit a response identifying an availability of one or more specified properties for a specified time frame;

determining, by the one or more processors, one or more static values associated with the one or more specified properties, wherein the one or more static values comprise a property margin, a conversion rate, and a return on sales;

calculating, by the one or more processors, an advance purchase window based on a difference between a current date and dates in the specified time frame;

determining, by the one or more processors, a dynamic conversion rate by automatically adjusting the conversion rate based on the advance purchase window, wherein the dynamic conversion rate reflects observed correlations between advance purchase timing and likelihood of purchase completion;

determining, by the one or more processors, based on an associated bid, the dynamic conversion rate, and the one or more static values, whether an affirmative response to the property level availability call is profitable; and in an instance in which the affirmative response is profitable, causing transmission, by the one or more processors, of the affirmative response, thereby reducing participation in unprofitable meta-auctions and improving computational efficiency of the meta-search system.

2. The method according to claim 1, further comprising: in an instance in which the affirmative response is not profitable, causing delay, by the one or more processors, of the affirmative response.

3. The method according to claim 1, further comprising: calculating, by the one or more processors, whether a bid price is less than a length of stay multiplied by the property margin multiplied by the conversion rate; and in an instance in which the bid price is less than a length of stay multiplied by the property margin multiplied by the conversion rate, determining, by the one or more processors, that the affirmative response is profitable.

4. The method according to claim 1, further comprising: calculating, by the one or more processors, whether a bid price is less than an average order value multiplied by property margin multiplied by a conversion rate multiplied by return on sales; and in an instance in which the bid price is less than the average order value multiplied by the property margin multiplied by the conversion rate multiplied by the return on sales, determining, by the one or more processors, that the affirmative response is profitable.

5. The method according to claim 1, further comprising: in advance of a property level availability call, generating, by the one or more processors, a bid sheet, the bid sheet configured to identify a plurality of specified properties and an associated bid for each of the plurality of specified properties.

6. The method according to claim 1, further comprising: determining, by the one or more processors, a property type of a specified property; and generating, by the one or more processors, a second availability call, the second availability call comprising at least information contained in the property level availability call and the property type, the property type indicative of a system to query for availability of the specified property.

7. The method according to claim 1, further comprising: determining, by the one or more processors, a desired bid placement in results for a specified property in advance of the property level availability call; and determining, by the one or more processors, a desired bid price, the desired bid price configured to achieve the desired bid placement.

8. The method according to claim 7, further comprising: calculating, by the one or more processors, an average order value based on the property level availability call, the calculation being based on a length of stay indicated in the property level availability call.

9. The method according to claim 8, further comprising: calculating, by the one or more processors, a conversion rate of a specified property identified in the property level availability call based on the advance purchase window; and determining, by the one or more processors, profitability of the desired bid price based on the average order value and the conversion rate.

10. The method according to claim 8, further comprising: calculating, by the one or more processors, the conversion rate based on sales of a specified property or based on sales of the specified property and converted cross sales.

11. A system for improving efficiency of a meta-search system by reducing participation in meta-auctions, the system comprising memory and one or more processors communicatively coupled to the memory, the one or more processors configured to:

receive a property level availability call configured to elicit a response identifying an availability of one or more specified properties for a specified time frame;

determine one or more static values associated with the one or more specified properties, wherein the one or more static values comprise a property margin, a conversion rate, and a return on sales;

calculate an advance purchase window based on a difference between a current date and dates in the specified time frame;

determine a dynamic conversion rate by automatically adjusting the conversion rate based on the advance purchase window, wherein the dynamic conversion rate reflects observed correlations between advance purchase timing and likelihood of purchase completion;

determine, based on an associated bid, the dynamic conversion rate, and the one or more static values associated with the one or more specified properties, whether an affirmative response to the property level availability call is profitable; and in an instance in which the affirmative response is profitable, cause transmission of the affirmative response, thereby reducing participation in unprofitable meta-auctions and improving computational efficiency of the meta-search system.

12. The system according to claim 11, wherein the one or more processors are further configured to:

in an instance in which the affirmative response is not profitable, cause delay of the affirmative response.

13. The system according to claim 11, wherein the one or more processors are further configured to:

calculate whether a bid price is less than a length of stay multiplied by the property margin multiplied by the conversion rate; and in an instance in which the bid price is less than a length of stay multiplied by the property margin multiplied by the conversion rate, determine that the affirmative response is profitable.

14. The system according to claim 11, wherein the one or more processors are further configured to:

calculate whether a bid price is less than an average order value multiplied by property margin multiplied by a conversion rate multiplied by return on sales; and in an instance in which the bid price is less than the average order value multiplied by the property margin multiplied by the conversion rate multiplied by the return on sales, determine that the affirmative response is profitable.

15. The system according to claim 11, wherein the one or more processors are further configured to:

in advance of a property level availability call, generate a bid sheet, the bid sheet configured to identify a plurality of specified properties and an associated bid for each of the plurality of specified properties.

16. One or more non-transitory computer-readable storage media for improving efficiency of a meta-search system by reducing participation in meta-auctions, the one or more non-transitory computer-readable storage media including instructions that, when executed by one or more processors, cause the one or more processors to:

receiving a property level availability call, the property level availability call configured to elicit a response identifying an availability of one or more specified properties for a specified time frame;

determining one or more static values associated with the one or more specified properties, wherein the one or more static values comprise a property margin, a conversion rate, and a return on sales;

calculating an advance purchase window based on a difference between a current date and dates in the specified time frame;

determining a dynamic conversion rate by automatically adjusting the conversion rate based on the advance purchase window, wherein the dynamic conversion rate reflects observed correlations between advance purchase timing and likelihood of purchase completion;

determining, based on an associated bid, the one or more static values, and the dynamic conversion rate, whether an affirmative response to the property level availability call is profitable; and in an instance in which the affirmative response is profitable, causing transmission of the affirmative response, thereby reducing participation in unprofitable meta-auctions and improving computational efficiency of the meta-search system.

17. The one or more non-transitory computer-readable storage media according to claim 16, further including instructions that, when executed by one or more processors, cause the one or more processors to:

in an instance in which the affirmative response is not profitable, cause delay of the affirmative response.

18. The one or more non-transitory computer-readable storage media according to claim 16, further including instructions that, when executed by one or more processors, cause the one or more processors to:

calculate whether a bid price is less than a length of stay multiplied by the property margin multiplied by the conversion rate; and in an instance in which the bid price is less than a length of stay multiplied by the property margin multiplied by the conversion rate, determine that the affirmative response is profitable.

19. The one or more non-transitory computer-readable storage media according to claim 16, further including instructions that, when executed by one or more processors, cause the one or more processors to:

calculate whether a bid price is less than an average order value multiplied by property margin multiplied by a conversion rate multiplied by return on sales; and in an instance in which the bid price is less than the average order value multiplied by the property margin multiplied by the conversion rate multiplied by the return on sales, determine that the affirmative response is profitable.

20. The one or more non-transitory computer-readable storage media according to claim 16, further including instructions that, when executed by one or more processors, cause the one or more processors to:

in advance of a property level availability call, generate a bid sheet, the bid sheet configured to identify a plurality of specified properties and an associated bid for each of the plurality of specified properties.

* * * * *